(12) United States Patent  
Konasiewicz et al.

(10) Patent No.: US 8,518,516 B1
(45) Date of Patent: Aug. 27, 2013

(54) INTERLOCKABLE FLOOR CONSTRUCTION RUNNER

(76) Inventors: Ann Konasiewicz, Carteret, NJ (US); Derek R. Avenue, Carteret, NJ (US)

( * ) Notice: Subject to any disclaimer, the term of this patent is extended or adjusted under 35 U.S.C. 154(b) by 244 days.

(21) Appl. No.: 12/970,522

(22) Filed: Dec. 16, 2010

(51) Int. Cl.
  *B32B 3/06* (2006.01)
(52) U.S. Cl.
  USPC .............................................. 428/100; 428/99
(58) Field of Classification Search
  USPC .................................................... 428/99, 100
  See application file for complete search history.

(56) References Cited

U.S. PATENT DOCUMENTS

| | | | |
|---|---|---|---|
| 3,517,407 A | 6/1970 | Wyant | |
| D281,752 S | 12/1985 | Dickens et al. | |
| 4,631,765 A * | 12/1986 | Casey | 5/417 |
| 4,822,669 A | 4/1989 | Roga | |
| 5,761,853 A * | 6/1998 | Trosper et al. | 52/3 |
| 5,970,541 A * | 10/1999 | Chiang | 5/420 |
| 2007/0275209 A1* | 11/2007 | Netravali et al. | 428/99 |
| 2008/0131680 A1 | 6/2008 | Bliton et al. | |
| 2010/0183814 A1* | 7/2010 | Rios et al. | 427/387 |
| 2011/0017341 A1* | 1/2011 | Terracino et al. | 139/383 R |

* cited by examiner

*Primary Examiner* — Alexander Thomas

(57) ABSTRACT

An interlockable floor construction runner provides temporary protection of floor surfaces. The runner utilizes interlockable structures to reduce hazardous bunching, slipping, or other unintended movement of the runner structure. The floor runner structure includes a runner having a first end, a second end, a first layer and a second layer. A first fastener is coupled to the first layer proximate the first end of the runner. A second fastener is coupled to the second layer proximate the second end of the runner. The second fastener is complimentary to the first fastener such that the second fastener is selectively couplable to an adjacently positioned first fastener of a second runner.

11 Claims, 4 Drawing Sheets

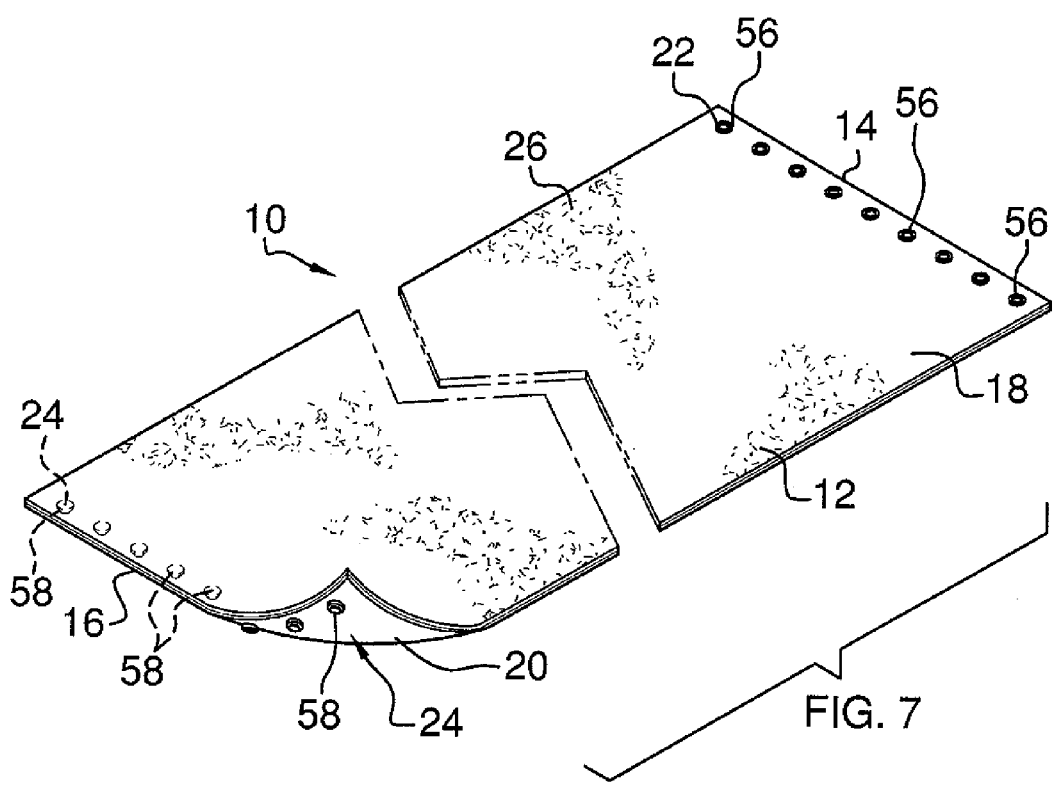

INTERLOCKABLE FLOOR CONSTRUCTION RUNNER

BACKGROUND OF THE DISCLOSURE

Field of the Disclosure

The disclosure relates to floor runners and more particularly pertains to a new floor runner for providing temporary protection of floor surfaces by utilizing interlockable floor runners to reduce hazardous bunching, slipping, or other unintended movement of the floor runners.

SUMMARY OF THE DISCLOSURE

An embodiment of the disclosure meets the needs presented above by generally comprising a runner having a first end, a second end, a first layer and a second layer. A first fastener is coupled to the first layer proximate the first end of the runner. A second fastener is coupled to the second layer proximate the second end of the runner. The second fastener is complimentary to the first fastener such that the second fastener is selectively couplable to an adjacently positioned first fastener of a second runner. Thus, a line of runners may be placed in a line and interlocked in series using first fastener and second fastener to cover a desired space.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 7 is a front top side perspective view of an embodiment of the disclosure.

DESCRIPTION OF THE PREFERRED EMBODIMENT

Figure 1:
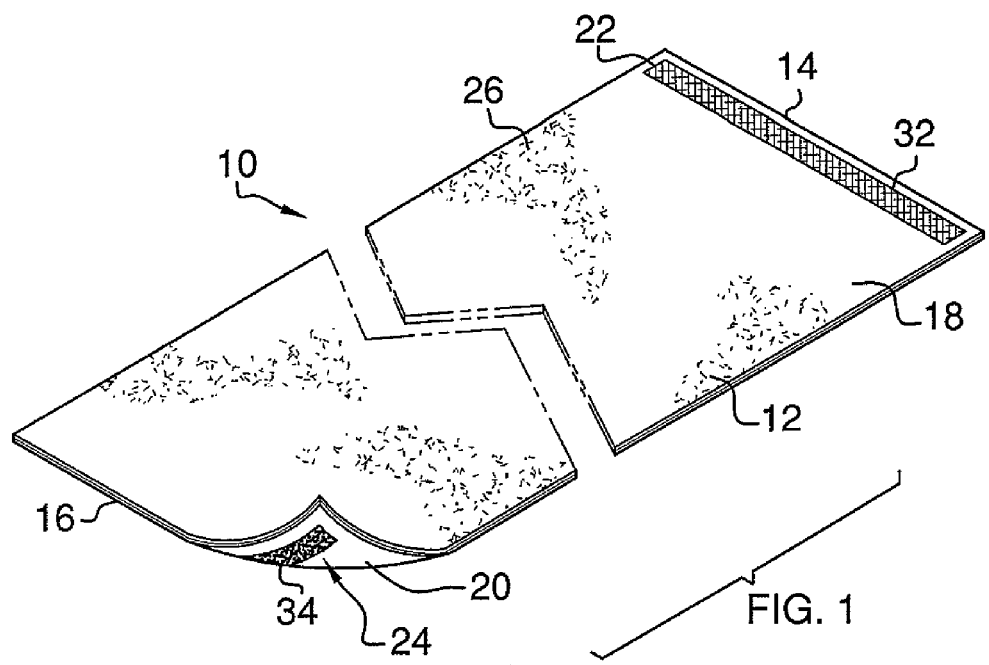
FIG. 1 is a front top side perspective view of an Interlockable Floor Construction Runner according to an embodiment of the disclosure.
Figure 2:
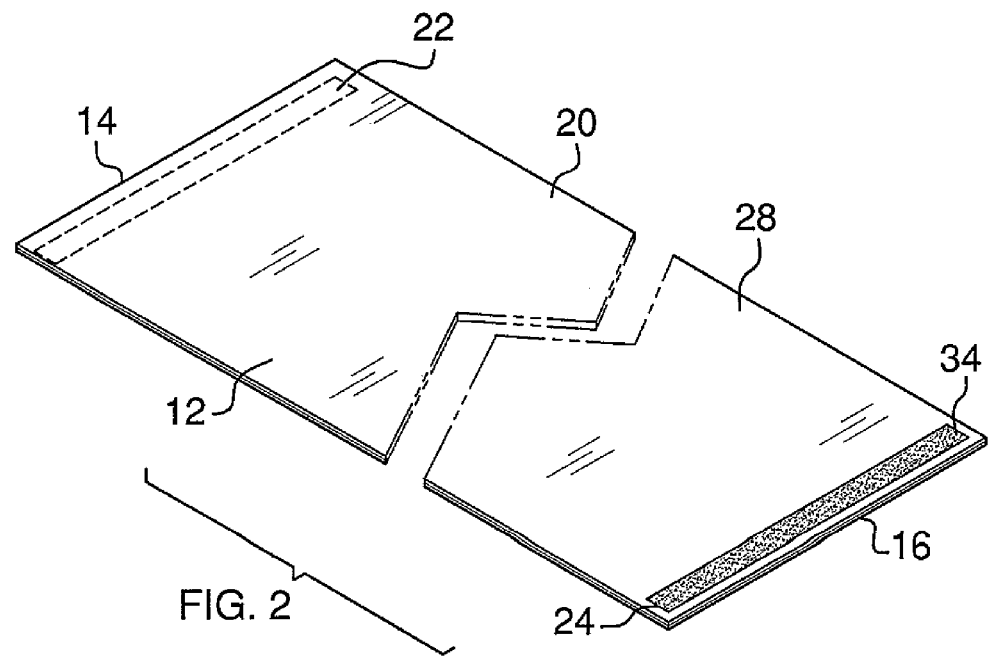
FIG. 2 is a back bottom side perspective view of an embodiment of the disclosure.
Figure 3:
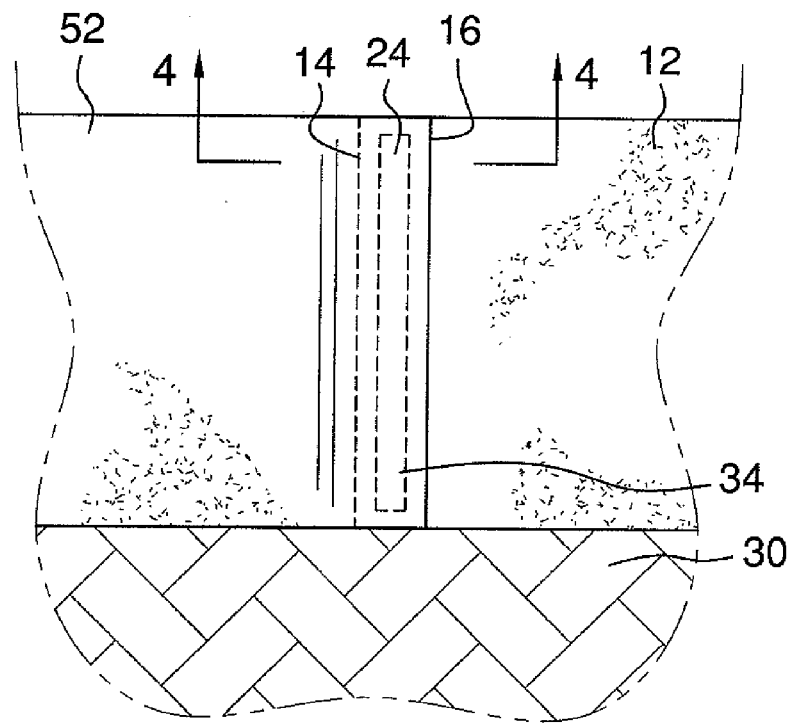
FIG. 3 is a top view of an embodiment of the disclosure.
Figure 4:
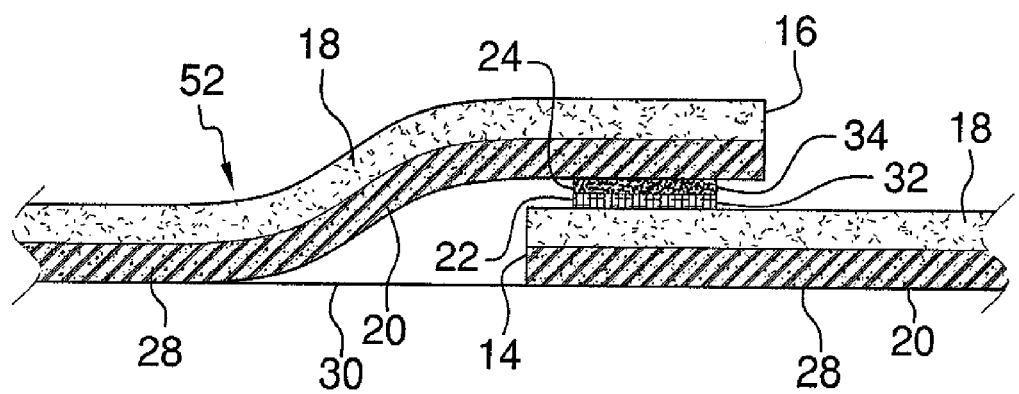
FIG. 4 is a cross-sectional view of an embodiment of the disclosure taken along line 4-4 in FIG. 3.

With reference now to the drawings, and in particular to FIGS. 1 through 7 thereof, a new floor runner embodying the principles and concepts of an embodiment of the disclosure and generally designated by the reference numeral 10 will be described.

As best illustrated in FIGS. 1 through 7, the interlockable floor construction runner 10 generally comprises a runner 12 having a first end 14, a second end 16, a first layer 18 and a second layer 20. A first fastener 22 is coupled to the first layer 18 proximate the first end 14 of the runner 12. A second fastener 24 is coupled to the second layer 20 proximate the second end 16 of the runner 12. The second fastener 24 is complimentary to the first fastener 22 such that the second fastener 24 is selectively couplable to an adjacently positioned first fastener 22 of a second runner 12. Thus, a line of runners 12 may be placed in a line and interlocked in series using first fastener 22 and second fastener 24 to cover a desired space.

The first layer 18 is designed to face upwardly in use and is constructed of absorbent canvas 26 or another similar material. The second layer 20 is constructed of a rubberized non-slip material 28 or other material that may provide both frictional engagement to a surface 30 and impermeability to liquids such as paint, varnish, or other material potentially harmful to surface 30. The first fastener 22 may be a hook portion 32 of hook and loop fastener. The second fastener 24 may be a loop portion 34 of hook and loop fastener. The positioning of the loop portion 34 on the second layer 20 prevents contact between the hook portion 32 on a free end of a chain of runners 12 and the surface 30. This arrangement protects surface 30 from damage which might be caused by the generally stiffer and more abrasive hook portion 32.

The second layer 20 includes a plurality of structural elements 38 designed for enhancing friction between the second layer 20 and the surface 30 contacted by the second layer 20. The plurality of structural elements 38 may be arranged along a length of the runner 12 extending between the first fastener 22 and the second fastener 24.

Figure 5:
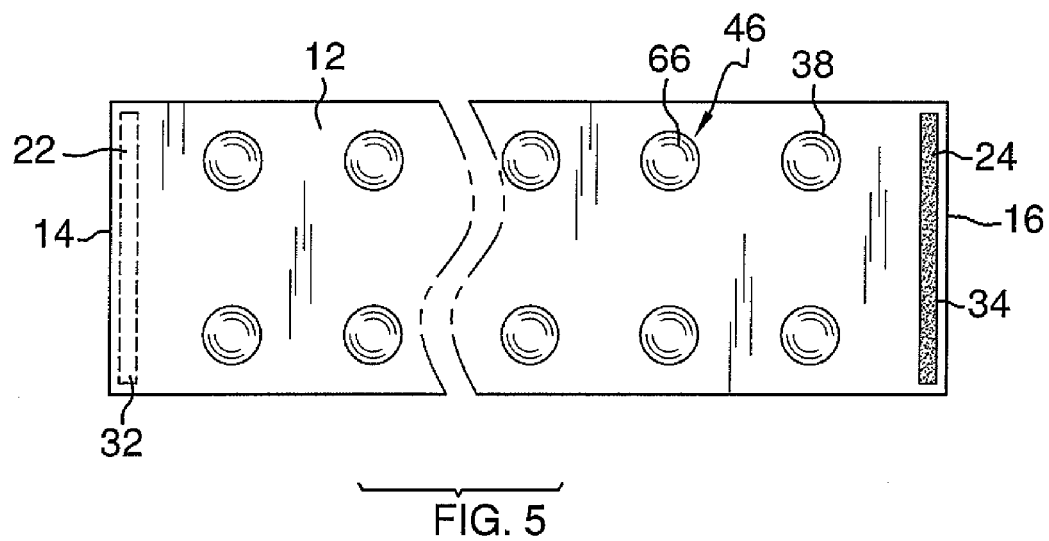
FIG. 5 is a bottom view of an alternate embodiment of the disclosure.
Figure 6:
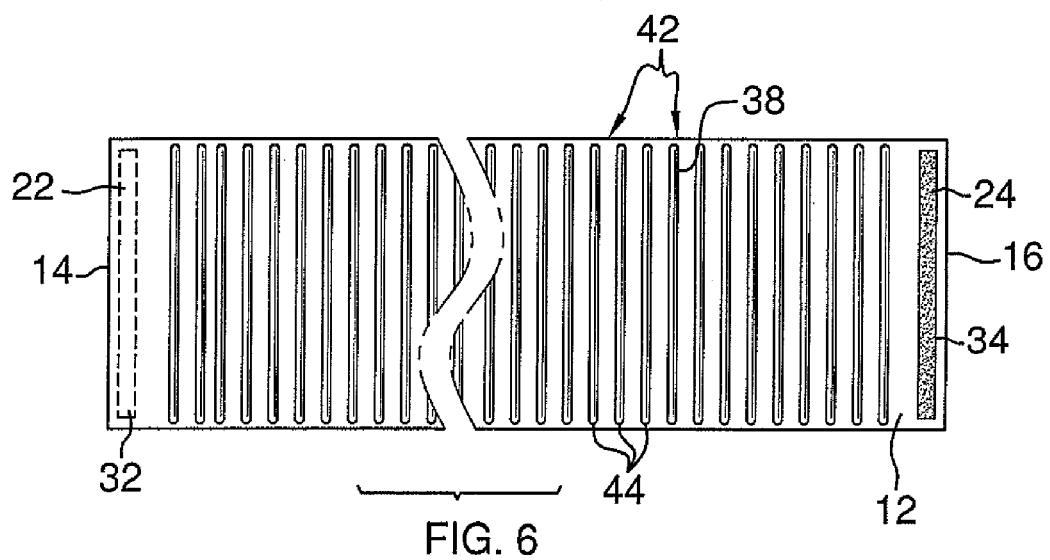
FIG. 6 is a bottom view of an alternate embodiment of the disclosure.

In an embodiment, the plurality of structural elements 38 are evenly spaced ridges 42 along the length of the runner 12 extending between the first fastener 22 and the second fastener 24. The ridges 42 may be achieved by either spaced elongated protrusions 44 extending from and across the runner 12 or spaced elongated channels extending into the runner 12. The structural elements 38 may alternately be formed by a geometric shape 46 such as a polygon, oval, or circle 66 as shown in FIG. 5 incorporated into a surface 44 of the second layer 20. Similar to the above description, the geometric shapes 46 may be formed by protrusions 64 or depressions arranged into either a recurring or irregular pattern across the surface 44.

In use, a first runner 12 is positioned on surface 44 with the second layer 20 facing and contacting the surface 44. Second fastener 24 contacts surface 44 at the second end 16 of the runner 12. However, first fastener 22 faces upwards on first layer 18. A second runner 52 may be positioned adjacent to and overlapping the first runner 12 aligning the second fastener 24 of runner 52 with the first fastener 22 of runner 12. Thus, runner 12 and runner 52 are interlocked. The same arrangement may be employed in series to cover any specific length. The runner 12 may also be provided with a length ranging from 3 feet to 20 feet. The runner 12 may also have a width between 18 inches and 54 inches.

As shown in FIG. 7, the first fastener 22 may be a male snap 56 and the second fastener 24 may be a complimentary female snap 58. The male snap 56 may be one of several male snaps 56 aligned adjacent to the first end 14 of the runner 12. The female snap 58 is one of a plurality of female snaps 58 aligned adjacent to the second end 16 of the runner 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. An interlockable floor construction runner comprising:
    a mat having a first end, a second end, a first layer and a second layer;
    a first fastener coupled to said first layer proximate said first end of said mat, said first fastener being a hook portion of hook and loop fastener;
    a second fastener coupled to said second layer proximate said second end of said mat, said second fastener being a loop portion of hook and loop fastener, said second fastener being complimentary to said first fastener such that said second fastener is selectively couplable to an adjacently positioned first fastener of a second mat;
    said second layer including a plurality of structural elements protruding from said second layer, each structural element being configured for enhancing friction between said second layer and a surface contacted by said second layer, said plurality of structural elements being arranged along a length of said mat extending between said first fastener and said second fastener; and
    each said structural element being a geometric shape.

2. The runner of claim 1, wherein said first layer is constructed of an absorbent material.

3. The runner of claim 1, wherein said first layer is constructed of canvas.

4. The runner of claim 1, wherein said second layer is constructed of a non-slip material.

5. The runner of claim 1, wherein said first fastener and said second fastener are a first portion of hook and loop fastener and a second portion of hook and loop fastener.

6. The runner of claim 1, wherein said plurality of structural elements is evenly spaced along said length of said mat extending between said first fastener and said second fastener.

7. The runner of claim 6, wherein said structural element is a straight ridge extending transversely across said runner relative to a longitudinal axis of said runner.

8. An interlockable floor construction runner comprising:
    a runner having a first end, a second end, a first layer and a second layer;
    a first fastener coupled to said first layer proximate said first end of said runner;
    a second fastener coupled to said second layer proximate said second end of said runner, said second fastener being complimentary to said first fastener such that said second fastener is selectively couplable to an adjacently positioned first fastener of a second said runner;
    wherein said first layer is constructed of absorbent canvas;
    wherein said second layer is constructed of a rubberized non-slip material;
    said first fastener being a hook portion of hook and loop fastener;
    said second fastener being a loop portion of hook and loop fastener;
    wherein said second layer includes a plurality of structural elements protruding from said second layer wherein said structural elements are configured for enhancing friction between said second layer and a surface contacted by said second layer; and
    wherein said plurality of structural elements is arranged along a length of said runner extending between said first fastener and said second fastener.

9. The runner of claim 8, wherein said plurality of structural elements is evenly spaced along said length of said runner extending between said first fastener and said second fastener.

10. The runner of claim 9, wherein said structural element is a straight ridge extending transversely across said runner relative to a longitudinal axis of said runner.

11. The runner of claim 8, wherein said structural element is a geometric shape incorporated into and forming protrusions from a surface of said second layer.

* * * * *